Aug. 29, 1961  C. J. WHEELER  2,997,787
"B-X CABLE" SHEATH CUTTER
Filed Feb. 6, 1959  2 Sheets-Sheet 1

INVENTOR
CHARLES J. WHEELER

BY  C. T. Cross
ATTORNEY

Aug. 29, 1961  C. J. WHEELER  2,997,787
"B-X CABLE" SHEATH CUTTER
Filed Feb. 6, 1959  2 Sheets-Sheet 2

INVENTOR
CHARLES J. WHEELER

BY  C T Cross
ATTORNEY

United States Patent Office 2,997,787
Patented Aug. 29, 1961

2,997,787
"B-X CABLE" SHEATH CUTTER
Charles J. Wheeler, 2078 W. Jackson St.,
Painesville, Ohio
Filed Feb. 6, 1959, Ser. No. 791,705
7 Claims. (Cl. 30—90.5)

This invention relates to a novel and improved cutter and more particularly relates to a new and improved device for cutting armored electrical cable, of the type usually referred to as "B-X Cable," without damaging the electrical conductor and/or electrical insulation contained within the metallic cable housing.

B-X Cable generally comprises one or more insulated electrical conductors disposed withing a flexible, i.e., non-brittle protective housing, formed of spirally wound, interlocking metal elements of a single strip of metal. Typically, the metal strip, usually formed of a soft iron material, has a curved cross-section, e.g., S-shaped, and is so wound in assembly that the successive leading and trailing edges, viewed longitudinally, consist of abutting elements interlocked to form a strong, continuous, flexible conduit for the insulated electrical conductor or conductors therein. The result is a durable, armored conduit of singular utility.

The very strength and durability of B-X Cable which make it so useful have heretofore combined to render cutting of the cable as is necessary in installing it, difficult. As will be appreciated, making the usual electrical connections necessitates exposing a portion of the conductor, as by cutting the cable in a manner to permit projecting a length of the insulated conductor or bare wire beyond the cut end of the armored housing. This necessity usually precludes simple shearing of the cable, contents and all. On the contrary, in most instances, the cutting must be done without any injury to the conduit contents.

The prior art cutters for B-X Cable have sought to solve this problem by seeking to cut one or more convolutions of the metal strip in a direction substantially perpendicular to the length of the unrolled metal strip, i.e., in a direction generally parallel to the length of the cable. When such a convolution is cut, the cable is then twisted and/or the free end of the cut convolution is rolled back. However, such cutting involves a number of problems since frequently sharp and jagged edges remain and since no clean cutting of the cable is accomplished.

In the present invention, a new and improved cutter is provided which in one operation transversely severs the wall of the armored housing without injuring the electrical conductor or its insulation. To this end, the apparatus of this invention comprises a pair of coacting jaws provided with curved cooperating cutter edges adapted transversely to cut through the wall of B-X Cable, and at least one cutter depth guide element actuated to advance toward the free ends of the cutters, i.e., toward the cable engaged by said cutter edges, as the jaws close, and to withdraw in the opposite direction as the jaws open.

Referring now to the accompanying drawing.

Figure 1:
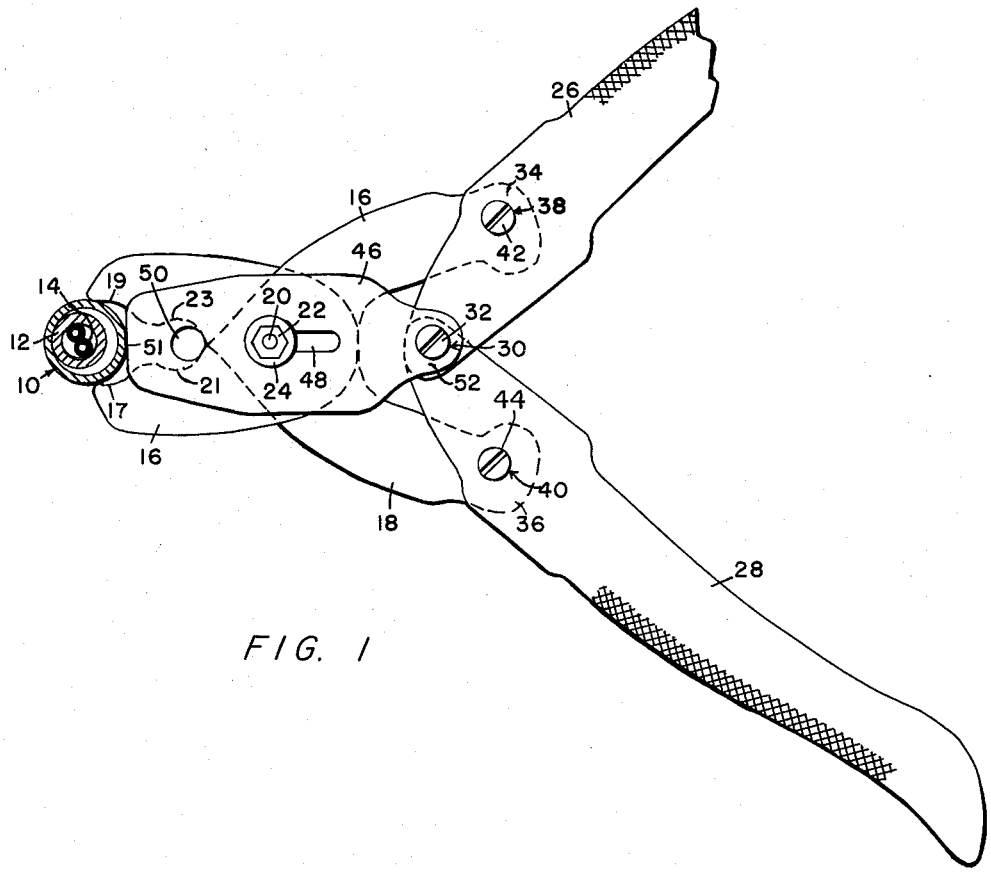
FIG. 1 is a fragmentary view of a cutter embodying the present invention as applied in a cutting position on a cable.

Referring more particularly to the drawing, in FIG. 1, there is shown in an operative cutting position about a B-X Cable, indicated at 10 and containing insulation 12 and two conductors 14, a cutter of this invention comprising cooperating jaws 16 and 18 provided with curved cutter edges 17 and 19 for armored cable or the like and cutter edges 21 and 23 for cutting or shearing of wire as is more fully described hereinafter.

Figure 3:
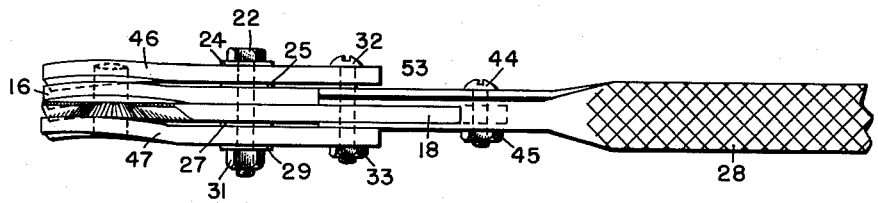
FIG. 3 is a fragmentary side view of the cutter as shown in FIG. 1.

Jaws 16 and 18 are pivotally connected at a first pivot 20 via a transverse pin or bolt 22 provided with a washer 24 and, as shown in FIG. 3, a nut 31 with additional washers 25, 27 and 29 as indicated (FIG. 3). Jaw 16 threadedly engages bolt 22 while jaw 18 does not.

The opposite ends 34 and 36 of jaws 16 and 18 respectively, are pivotally connected via machine screws 42 and 44, respectively, and nut 45 as well as a corresponding nut (not shown) on screw 42, to handles 26 and 28, respectively, intermediate their ends. The handles 26 and 28 are pivotally connected to each other at their ends at a second pivot 30 via machine screw 32 and nut 33.

Figure 4:
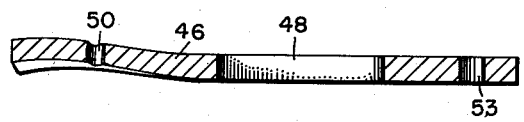
FIG. 4 is a side view of the cutter depth guide element.

An important feature of the invention is the provision of at least one, and preferably two, jaw-overlaying, cutter depth guide elements 46 and 47. These two elements are identical in plan view but are curved as indicated in FIGS. 3 and 4. As shown in FIGS. 1 and 4, element 46 is provided with a centrally-disposed longitudinal slot 48, and an opening 50 spaced toward the cutter jaw end 51 of element 46. At the opposite or lower end of element 46 is a tonguelike portion 52 provided with a central hole 53. Element 46, and corresponding element 47, are engaged via their openings 53 by machine screw 32. Bolt 22 extends transversely through both elements 46 and 47 and is slidable therein; conversely speaking, elements 46 and 47 slidably engage bolt 22. Elements 46 and 47 are curved correspondingly in the portions thereof containing holes 50 to provide a closely-overlaying fit adjacent cutter jaws in operation, as shown in FIGS. 3 and 4.

Figure 2:
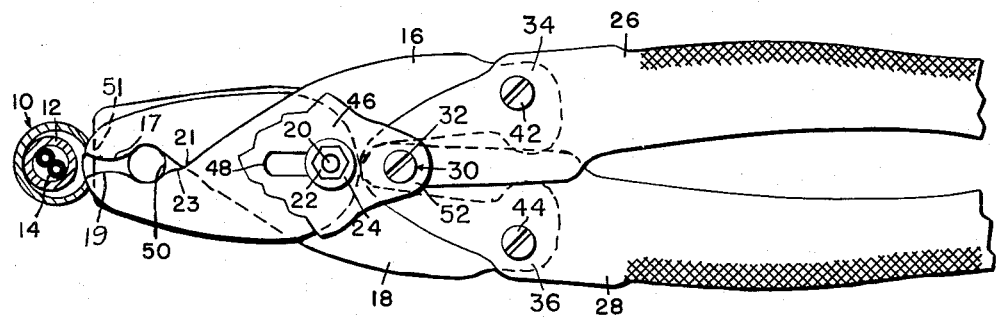
FIG. 2 is a view similar to FIG. 1 but with parts illustrating the completion of the cutting motion.

The operation of the cutter of this invention can be explained by reference to FIGS. 1 and 2. As handles 26 and 28 are spread, jaws 16 and 18, via compound leverage action through spreading of their ends 34 and 36, also are opened; simultaneously, cutter depth guide elements 46 and 47 withdraw through sliding downwardly on bolt 22 in response to movement of pivot 30 away from the free ends of the cutters.

As a result, cutter edges 17 and 19 are in a position to engage, transversely, the B-X Cable 10 to be cut. As the handles 26 and 28 are closed, the reverse movement of elements 46 and 47 occurs. Thus, it will be understood that as closing pressure is applied to the handles 26 and 28, cutter edges 17 and 19 pierce and cut through the wall of cable 10. Then, as the cutter edges would otherwise damage and/or cut the interior insulation or conductors, the cutting depth guide edges 51 of elements 46 and 47, on opposite sides of the cut, bear upwardly against the wall of cable 10 and rise thereagainst as the cutting edges continue to cut through the wall of the cable. The result is that the radial depth of cut is automatically decreased as the cutter edges approach each other until as shown in FIG. 2, when the cutter jaws are closed, the ends 51 of elements 46 and 47 extend to substantially the ends of the jaws 16 and 18. Hence, it will be understood that before the cutter edges can touch the contents of the armored cable the radial cutting depth is reduced sufficiently that continuance of the cutting involves a constantly decreasing sector of the circumference of the cable exterior. Depending on the proportions of the cutter elements and the size of the cable or other article being cut, the cutting action can be repeated if necessary, e.g., on diametrically-opposite sides of the cable.

Another feature of the cutter of this invention is the provision of coacting cutter edges 21 and 23 which, in combination with holes 50, provide means to cut a wire extended therethrough. Hence, it will be appreciated that such a device comprises convenient means to cut the electrical conductors as desired where a free end of the wire can be extended therethrough.

Figure 5:
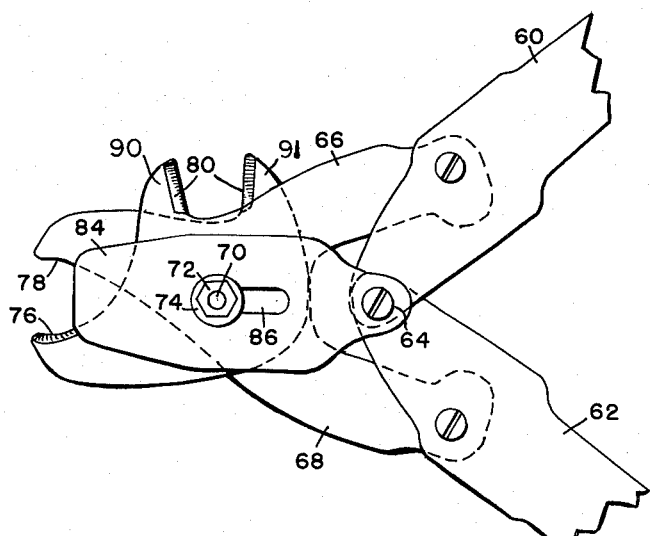
FIG. 5 is a view similar to FIG. 1 of another embodiment of apparatus of this invention.

FIG. 5 illustrates another embodiment of apparatus of this invention wherein a side-mounted pair of nipper-type wire cutter jaws is provided for cutting wire or the like. As there shown, a pair of cutter jaws 66 and 68 provided with cutter edges 76 and 78, and side-mounted nipper cutter 80, is pivotally joined at pivot 70 via bolt 72 with washer 74 and a nut (not shown). The side-mounted nipper cutter 80 comprises two laterally extending jaws 90 and 91, and the jaw 90 is off-set from the plane of the jaw 66 of which it is a part, so that the cutting edges 80 are in substantially the same plane to provide nipper type cutter jaws. The free ends of the jaws 66 and 68 are pivotally connected to handles 60 and 62 in a manner as shown generally in FIGS. 1 and 2. There are provided two cutter guide elements 84 similar to elements 46 and 47, each having a longitudinal slot 86 and pivotally secured via machine screw 64 which also connects handles 60 and 62. It will be appreciated that jaws 66 and 68 are so proportioned as to permit shear type cutter edges 76 and 78 and elements 84 to coact as necessary before cutter edges 80 contact each other.

The various apparatus components of this invention can be formed of any desired metal or alloy, e.g., tool steel, or the like, provided the material has sufficient strength and durability. It also will be appreciated that the apparatus of this invention may be used in different applications other than cutting B-X Cable, e.g., in the cutting of flat strap metal or the like.

While compound leverage type clamping means are illustrated and, at present, preferred, it will be understood that other pressure applying means can be utilized. Thus, hydraulic means can be used, e.g., a hydraulic cylinder and suitable actuating pump can be employed to actuate the jaws, provided at least one simultaneously actuated cutter depth guide element is provided.

It is to be understood that, although the invention has been described with specific reference to particular embodiments thereof, it is not to be so limited since changes and alterations therein may be made which are within the full intended scope of this invention as defined by the appended claims.

What is claimed is:

1. A cutter comprising, in combination, a pair of coacting cutting edges, means to apply cutting pressure thereto, at least one cutter depth guide adjacent said cutting edges and means for simultaneously moving said at least one cutter depth guide with respect to said edges to decrease the effective cutting depth as the cutting edges move closer together.

2. A cutter as in claim 1 wherein said means comprise a compound leverage device.

3. A cutter comprising, in combination, a pair of coacting jaws provided with cooperating cutting edges, at least one cutting depth guide element adjacent said jaws and actuated to advance toward the free ends of said jaws as they close, and means to close said jaws.

4. A cutter for a tubular structure, said cutter comprising, in combination, a pair of pivotally-connected, coacting jaws provided with cooperating cutting edges, at least one cutter depth guide element slidably secured to the pivotal connection joining said jaws, and means simultaneously to close said jaws and slide said element toward the free ends of said jaws.

5. An armored cable cutter comprising, in combination, a pair of cutter jaws having coacting cutting edges thereon, said jaws being pivotally connected intermediate their ends at a first pivot, said jaws being pivotally connected to handles which are themselves pivotally connected at a second pivot, at least one slotted element pivotally connected at said second pivot and slidably engaging said first pivot means to slide said element toward free ends of said cutter jaws as they close.

6. A cutter comprising, in combination, a pair of coacting scissors-type cutter jaws, each provided with at least one sharpended cutting edge adapted for cutting action in cooperation with the corresponding portion of the cutting edge of the other jaw, said jaws being pivotally connected intermediate their ends at a first pivot, said jaws being pivotally connected to handles pivotally connected at a second pivot on opposite sides of said second pivot, two members actuated by said handles and slidably secured at said first pivot whereby closure of the jaws moves said members in unison toward the free ends of the jaws.

7. A cutter for B-X Cable which comprises a pair of cutter jaws each terminating at one end in a curved cutting edge and being pivotally joined intermediate their ends at a first common pivot, the opposite ends of said jaws being pivotally secured to pivotally-joined handles on opposite sides of the second common pivot joining said handles, at least one jaw-overlaying slotted element secured at one end to said second common pivot and intermediate its end having a longitudinal slot slidably engaging said first common pivot whereby closure of said handles closes the cutting jaws and simultaneously advances said slotted element toward the free ends of said jaws to define a constantly-decreasing radial depth of cut as the cutting edges approach each other.

No references cited.